US006571259B1

(12) United States Patent
Zheng et al.

(10) Patent No.: US 6,571,259 B1
(45) Date of Patent: May 27, 2003

(54) PREALLOCATION OF FILE SYSTEM CACHE BLOCKS IN A DATA STORAGE SYSTEM

(75) Inventors: Jiannan Zheng, Framingham, MA (US); Xiaoye Jiang, Shrewsbury, MA (US); Uresh Vahalia, Waban, MA (US)

(73) Assignee: EMC Corporation, Hopkinton, MA (US)

( * ) Notice: Subject to any disclaimer, the term of this patent is extended or adjusted under 35 U.S.C. 154(b) by 151 days.

(21) Appl. No.: 09/669,347

(22) Filed: Sep. 26, 2000

(51) Int. Cl.[7] .......................... G06F 12/00; G06F 17/00
(52) U.S. Cl. ...................... 707/205; 707/202; 707/206; 710/74
(58) Field of Search ................................ 707/202, 205, 707/206; 710/74

(56) References Cited

U.S. PATENT DOCUMENTS

| | | | |
|---|---|---|---|
| 5,175,837 A | 12/1992 | Arnold et al. ............... | 395/425 |
| 5,175,852 A | 12/1992 | Johnson et al. .............. | 395/600 |
| 5,218,695 A | 6/1993 | Noveck et al. .............. | 395/600 |
| 5,255,270 A | 10/1993 | Yanai et al. ................. | 371/10.2 |
| 5,276,867 A | 1/1994 | Kenley et al. .............. | 395/600 |
| 5,341,493 A | 8/1994 | Yanai et al. ................. | 395/425 |
| 5,367,698 A | 11/1994 | Webber et al. .............. | 395/800 |
| 5,381,539 A | 1/1995 | Yanai et al. ................. | 395/425 |
| 5,535,381 A | 7/1996 | Kopper ........................ | 395/600 |
| 5,594,863 A | 1/1997 | Stiles ........................ | 395/182.13 |
| 5,701,516 A | 12/1997 | Cheng et al. ................ | 395/842 |
| 5,737,747 A | 4/1998 | Vishlitzky et al. .......... | 711/118 |
| 5,835,953 A | 11/1998 | Ohran ......................... | 711/162 |
| 5,857,208 A | 1/1999 | Ofek ........................... | 707/204 |
| 5,878,434 A * | 3/1999 | Draper et al. ............... | 707/202 |
| 5,889,935 A | 3/1999 | Ofek et al. .............. | 395/182.04 |
| 5,893,140 A * | 4/1999 | Vahalia et al. .............. | 711/118 |
| 6,185,663 B1 * | 2/2001 | Burke ......................... | 711/156 |

OTHER PUBLICATIONS

Steere et al., "Efficient User–Level File Cache Management on the Sun Vnode Interface," USENIX Summer Conference, Jun. 11–15, 1990, Anaheim, California, pp. 325–331.

Uresh Vahalia, *UNIX Internals: The new frontiers, Chapter 9, "File System Implementations,"* Prentice–Hall, Inc., Upper Saddle River, New Jersey, 1996, pp. 261–289.

Sun Microsystems, Inc., "NFS: Network File System Protocol Specification," Network Working Group, http://www.attrition.org/~modify/texts/rfc/rfc1094.txt, Mar. 1989, 23 pages.

D. L. Burkes and R.K. Treiber, "Design Approaches for Real–Time Transaction Processing Remote Site Recovery," *Digest of Papers in Spring COMPCON90*, Feb. 26–Mar. 2, 1990, *Thirty–Fifth IEEE Computer Society International Conference*, San Francisco, CA, pp. 568–572.

* cited by examiner

Primary Examiner—Safet Metjahic
Assistant Examiner—Cindy Nguyen
(74) Attorney, Agent, or Firm—Howrey Simon Arnold & White LLP

(57) ABSTRACT

A file server provides transaction processing capabilities previously supplied by the operating system of a host computer. On-disk file system metadata is changed only at commit time, and a transaction log protects the transition. The disk state can only be a consistent state, resulting from a commit operation. All disk-block reservation and pre-allocation mapping are in the memory, and after a crash, they are automatically discarded. The file server therefore relieves the client of processing burden and also reduces network traffic. In addition, the file server can more efficiently perform the transaction processing capabilities and reduce the frequency of access to storage by judicious allocation of file system blocks and transfer of file system blocks between file system objects, cache memory, and the transaction log. The differentiation between preallocation states and allocation states of in-memory file system blocks also permits application programs to more efficiently transfer data between files.

33 Claims, 10 Drawing Sheets

| FILE SYSTEM BLOCK NO. | ALLOCATED ON - DISK | IN MEMORY FILE SYSTEM STATE | | FILE SYSTEM CACHE STATE | |
|---|---|---|---|---|---|
| | | ACTIVE | ALLOCATED | IN CACHE | WRITE PENDING |
| 0 | 0 | 0 | 0 | 0 | 0 |
| 1 | 0 | 1 | 0 | POINTER | 1 |
| 2 | 1 | 1 | 1 | POINTER | 0 |
| 3 | 1 | 1 | 1 | POINTER | 1 |
| 4 | 1 | 1 | 1 | 0 | 0 |
| 5 | 1 | 0 | 0 | 0 | 0 |
| 6 | 1 | 1 | 0 | POINTER | 1 |

| ACTIVE | ALLOCATED | STATE |
|---|---|---|
| 0 | 0 | FREE |
| 1 | 0 | PREALLOCATED |
| 1 | 1 | ALLOCATED |

PREALLOCATION OF FILE SYSTEM CACHE BLOCKS IN A DATA STORAGE SYSTEM

BACKGROUND OF THE INVENTION

1. Limited Copyright Waiver

A portion of the disclosure of this patent document contains computer code listings to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates generally to file servers, and more particularly to management of a file system cache.

3. Background Art

Network applications have required increasingly large amounts of data storage. Network data storage has been provided by a file server having at least one processor coupled to one or more disk drives. The file server executes a file system program that maps file names and block offsets in the files to physical addresses of data blocks on the disk drives. Typically the file system program maintains a UNIX-based file system having a hierarchical file system structure including directories and files, and each directory and file has an "inode" containing metadata of the directory or file. Popular UNIX-based file systems are the UNIX file system (ufs), which is a version of Berkeley Fast File System (FFS) integrated with a vnode/vfs structure, and the System V file system (s5fs). The implementation of the ufs and s5fs file systems is described in Chapter 9, pp. 261–289, of Uresh Vahalia, Unix Internals: The New Frontiers, 1996, Prentice Hall, Inc., Simon & Schuster, Upper Valley River, N.J. 07458.

Of concern to users is not only the capacity and availability of network storage but also the integrity of data in the event of a system crash. Traditionally, users have relied on transaction processing techniques to maintain database consistency in the presence of a system crash. A common transaction processing technique is to subdivide an application program of a host processor into a series of transactions. Each transaction includes a set of read-write instructions that change the database from one consistent state to another. The set of read-write instructions for each transaction is terminated by an instruction that specifies a transaction commit operation. During the execution of the transaction, the database may become inconsistent. For example, in an accounting application, a transaction may have the effect of transferring funds from a first account to a second account. The application program has a first read-write instruction that debits the first account by a certain amount, and a second read-write instruction that credits the second account by the same amount. Before and after the transaction, the database has consistent states, in which the total of the funds in two accounts is constant. In other words, the total of the funds in the two accounts at the beginning of the transaction is the same as the total at the end of the transaction. During the transaction, the database will have an inconsistent state, in which the total of the funds in the two accounts will not be the same as at the beginning or at the end of the transaction.

The operating system responds to the transaction commit operations in such a way that it is possible to recover from a system failure by restoring the database to its consistent state existing just after commitment of the last completed transaction. A typical way of providing such recovery is to maintain a log file of the database changes and the commit commands. The log includes a sufficient amount of information (such as "before" and "after" images) in order to undo the changes made to the database since the last commit command.

Network clients typically use a network file system access protocol to access one or more file systems maintained by the file server. One popular network file system access protocol is the Network File System (NFS). NFS is described in "NFS: Network File Systems Protocol Specification," RFC 1094, Sun Microsystems, Inc., Mar. 1, 1989. NFS Version 2 has synchronous writes. When a client wants to write, it sends a string of write requests to the server. For each write request, the server writes data and attributes to disk before returning to the client an acknowledgement of completion of the write request. The attributes include the size of the file, the client owning the file, the time the file was last modified, and pointers to locations on the disk where the new data resides. This synchronous write operation is very slow, because the server has to wait for disk I/O before beginning a next write request.

NFS Version 3 has asynchronous writes. In the asynchronous write protocol, the client sends a string of write requests to the server. For each write request, the server does a "fast write" to random access memory, and returns to the client an acknowledgment of completion before writing attributes and data to the disk. At some point, the client may send a commit request to the server. In response to the commit request, the server checks whether all of the preceding data and attributes are written to disk, and once all of the preceding data and attributes are written to disk, the server returns to the client an acknowledgment of completion. This asynchronous write protocol is much faster than a synchronous write protocol.

The asynchronous write protocol introduces difficulties if users are permitted to access files that have been corrupted by a system crash. For example, NFS version 3 permits file attributes and file data to be written to the file server in any order. If the new attributes are written before the new data and the server crashes, then upon recovery, the new attributes are found and decoded to obtain pointers to data. The file may be corrupted if not all of the new data were written to disk. In addition, the pointers for the new data not yet written may point to blocks of data from an old version of a different file. Therefore, a data security problem may occur, since the client may not have access privileges to the old version of the different file.

A solution to this data consistency problem is described in Vahalia et al., U.S. Pat. No. 5,893,140 issued Apr. 6, 1999, incorporated herein by reference. The file server is provided with a file system cache. Data and attributes are stored in the file system cache and are not written down to storage until receipt of a commit request from the client. When the commit request is received, the data are sent before the attributes from the file system cache to the storage layer.

Although the introduction of a file system cache solves some problems associated with an asynchronous write protocol, it is insufficient to fully restore a file that has been corrupted by a system crash. Conventional transaction processing techniques at the application level and operating system level are sufficient to fully restore a file that has been corrupted, but these techniques are too burdensome to be used for all applications.

SUMMARY OF THE INVENTION

In accordance with one aspect of the invention, there is provided a method of operating a file server having a file system cache memory and storage containing a file system. The method includes the file server receiving at least one write request from at least one client, and in response, writing new file system attributes and new file system data to the file system cache memory. The new file system attributes include new links between file system objects and file system blocks. The method further includes the file server receiving a commit request from the client, the new file system attributes and the new file system data not being written into the file system in storage until receipt of the commit request, and in response to the commit request, writing the new file system attributes and the new file system data to the file system in storage. The file server further maintains in memory a directory and file mapping data structure for the file system. The directory and file mapping data structure permits file system block allocations and linkages between file system objects and the file system blocks to change during read/write access to the file system by the client prior to receiving the commit request. The file system block allocations include allocated blocks having block allocations that are the same as block allocations in the file system as stored in the storage, and preallocated blocks having block allocations that are different from block allocations in the file system as stored in the storage.

In accordance with another aspect, the invention provides a file server including a file system cache memory and storage. The file server further includes means responsive to a write request from a client for writing new file system attributes and new file system data to the file system cache memory, the new file system attributes including linkages between file system objects and file system blocks. The file server further includes means responsive to a commit request from the client for writing the new file system data and new file system attributes to a file system in the storage. Moreover, the file server includes means for maintaining in memory a directory and file mapping data structure for the file system. The directory and file mapping data structure permits file system block allocations and linkages between file system objects and file system blocks to change during read/write access to the file system by the client prior to receiving the commit request. The file system block allocations include allocated blocks having block allocations that are the same as block allocations in the file system as stored in the storage, and preallocated blocks having block allocations that are different from block allocations in the file system as stored in the storage.

In accordance with yet another aspect, the invention provides a file server including a file system layer for mapping file names to data storage locations in response to a write request from a client, a file system cache connected to the file system layer for storing new file system attributes and new file system data in response to the write request from the client; and nonvolatile storage connected to the file system layer for storing the new file system attributes and the new file system data in response to a commit request from the client. The file system layer is programmed for responding to the write request from the client by writing the new file system attributes and the new file system data to the file system cache and not writing the new file system attributes and the new file system data to the file system in storage until receipt of the commit request from the client. The file system layer is programmed for responding to the commit request from the client by writing the new file system data and the new file system attributes from the file system cache to the nonvolatile storage. The file system layer is further programmed to maintain in memory a directory and file mapping data structure for the file system. The directory and file mapping data structure permits file system block allocations and linkages between file system objects and the file system blocks to change during read/write access to the file system by the client prior to receiving the commit request. The file system block allocations include allocated blocks having block allocations that are the same as block allocations in the file system as stored in the storage, and preallocated blocks having block allocations that are different from block allocations in the file system as stored in the storage.

Figure 1:
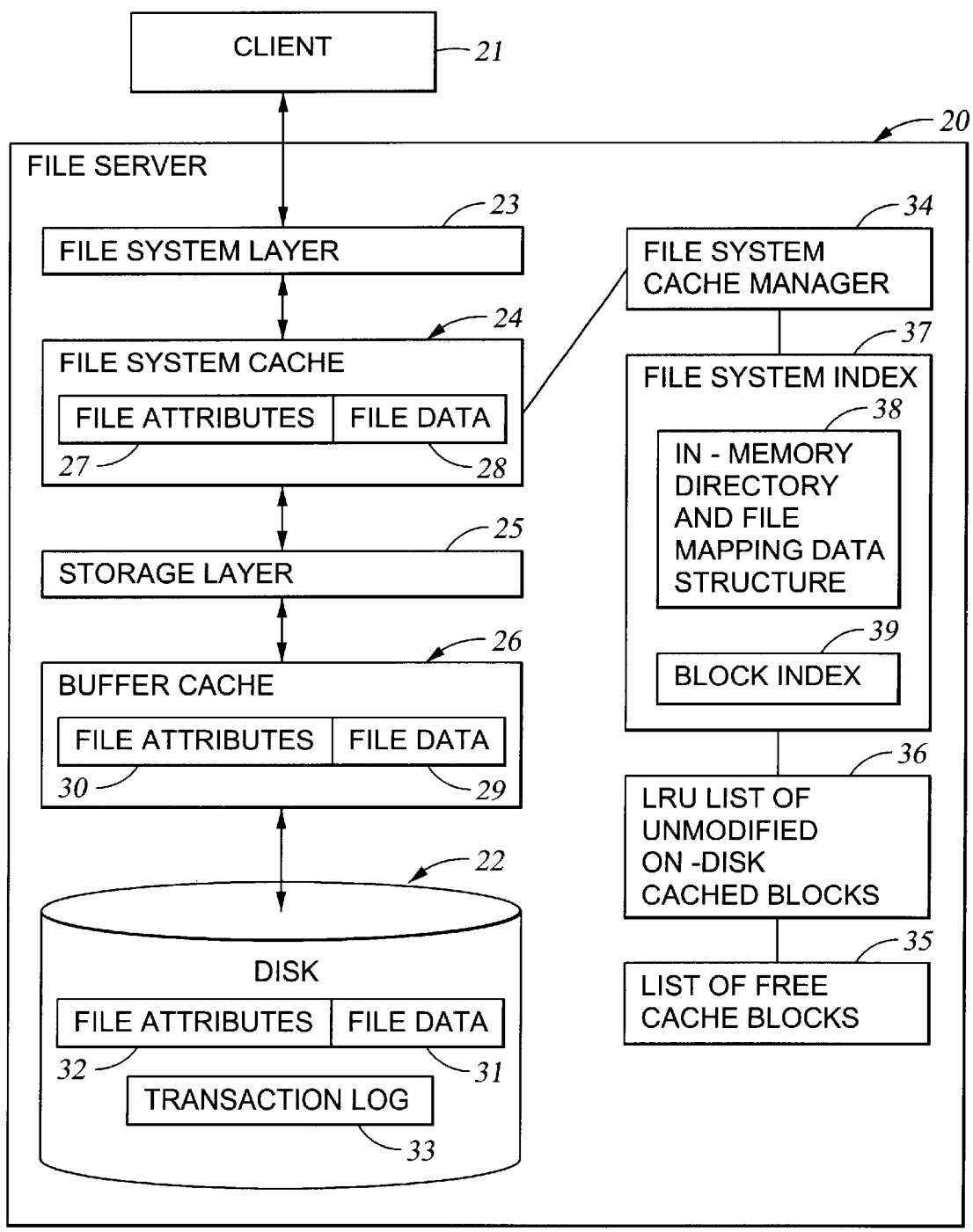
FIG. 1 is a block diagram of a file server incorporating the present invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a block diagram of a file server 20 for servicing file access requests from a client 21. The request is serviced by passing data from the client 21 to disk storage 22 through a file system layer 23, a file system cache 24, a storage layer 25, and a buffer cache 26. The file system layer 23 manages the organization of files and directories into logical blocks of data, which appear to the file system layer to have contiguous addresses. The storage layer 25 is responsible for mapping the logical blocks of data to physical storage locations on the disk storage 22. A buffer cache 26 is provided at the storage level in order to reduce the time delay for accessing data that is most frequently accessed. In addition, file attributes 27 and file data 28 are stored in the file system cache 24 and are not written down to storage until receipt of a commit request from the client 21. When the commit request is received, the data 28 are sent before the attributes 27 from the file system cache 24 to the storage layer 25.

The file server 20 is constructed so that the order in which the file data 28 and the file attributes 27 are written from the file system cache 24 to the storage layer 25 is the order in which the file data 28 and file attributes 27 are written to nonvolatile storage. In other words, if file attributes are found in storage upon recovery, then so will the corresponding file data. This can be done in a number of ways. For example, all of the data and attributes written to the storage layer 25 are written to the buffer cache 26, and then the file data 29 in the buffer cache 26 are written to the disk storage 22 before the file attributes 30 are written to the disk storage 22. Upon recovery, the file data 31 and the file attributes 32 are read from the disk storage 22. Alternatively, the buffer cache 26 can be nonvolatile, battery-backed semiconductor memory, so that the order in which attributes and data are written from the buffer cache 26 to the disk 22 does not matter. In any case, a data security problem associated with asynchronous write operations is avoided by keeping new file attributes and new file data in the file system cache until receipt of a commit request from the client, and sending the new file data first followed by the new file attributes down to storage upon receipt of the commit request.

The file server 20 can be constructed in various ways. For example, a small capacity file server can be constructed by programming a conventional computer of the kind having a processor, random access memory, and a number of disk drives. In this case, a certain amount of the random access memory is allocated for the file system cache 24, and a certain amount of the random access memory is allocated to the buffer cache. For a large capacity file server, the file system layer 23 and file system cache 24 could be implemented in a conventional computer, or replicated in a number of conventional computers, and the storage layer, buffer cache 26, and the disk storage 22 could be provided by a cached disk storage subsystem. Details regarding the use of a cached disk storage subsystem in a file server are found in the above-cited Vahalia et al., U.S. Pat. No. 5,893,140.

The present invention more particularly concerns efficient management of the file system cache 24 in such a way as to facilitate recovery after a systems crash. It is desired to manage the file system in such a way that the on-disk file structure is in a consistent and reasonable state after recovery from a system crash. For example, the recovery process accesses a transaction log 33 maintained in the disk storage 22, in order to restore the state of the file system to the state existing at the time of the last commit to each directory, file, or other file system object such as a link. It is also desired to improve management of the file system cache in such a way that is transparent to upper levels of the file system layer 23.

The file system cache 24 is managed by a file system cache manager routine 34 that keeps up to a certain number of file system blocks in random access memory. The file system blocks kept in the file system cache include blocks that are not yet in the on-disk file system, blocks that are in the on-disk file system but have been modified so that they have contents different from their contents in the on-disk file system, and recently accessed cache blocks that are in the on-disk file system and have not been modified. Cached blocks that are in the on-disk file system and have not been modified can be deleted from the cache for re-use of the cache memory to store new blocks or blocks that are about to be modified. For example, when an access to the file system requires a new block or requires modification of an on-disk block, a cache block is allocated for the new block or the modified version of the on-disk block by first checking a list of free cache blocks 35, and if the list of free cache blocks is empty, then reusing a cache block presently storing the least recently used (LRU) unmodified on-disk cached block. The least recently used unmodified on-disk cached block is indicated by a pointer taken from the head of a LRU list 36 of the unmodified on-disk cached blocks. The list 35 of free cache blocks is managed by setting the list to an initial allocation, and whenever a block in the file system cache 24 is no longer needed due to a deletion of the contents of the cache block from the file system, then returning a pointer to the block to the list of free cache blocks. The LRU list 36 is managed by inserting on the list a pointer to each cache block when the contents of the cache block are committed to the on-disk file system, which occurs in response to a commit request from the client 21.

The file system cache manager 34 also accesses an in-memory file system index 37. The in-memory file system index 37 includes indexing information for file system objects that have been added, deleted, or otherwise modified from the committed, on-disk state. The in-memory file system index 37 has an upper level and a lower level. The upper level is an in-memory directory and file mapping data structure 38 that is similar to the on-disk directory structure. For example, the directory structure is a hierarchy including a root directory, zero or more subdirectories, and zero or more files or other objects such as links in the root directory or in subdirectories. Preferably, the on-disk file system structure is compliant with an industry standard for a UNIX-based file system. The lower level of the in-memory file system index includes a block index 39 of the status of the storage blocks in the file system. The block index, for example, is a table of flags and pointers, as described below with reference to 3, of all of the storage blocks in the file system. For file systems having a very large number of blocks, the block index could be a list of entries in the table structure of FIG. 3 excluding the entries for blocks that are free in the on-disk file system and also free in the in-memory file system.

The on-disk file system has only two allocation states of a storage block. These two states are allocated or not allocated. A "free" block is not allocated. In accordance with an aspect of the present invention, the file system cache manager 34 recognizes an additional state for file system blocks that are not free blocks. In the file server of FIG. 1, the active blocks (i.e., the blocks that are not free) can have a "preallocated" state distinct from the allocated state of the logical blocks in the on-disk file system. In particular, the file system cache manager 34 recognizes that the state of active blocks can change from preallocated to allocated upon a commit operation, and also the state of an allocated block can change to either a free state or to the preallocated state prior to a commit operation. By recognizing preallocated as well as allocated active states, the file system cache manager can more effectively use random access memory in the file server. In addition, by recognizing the preallocated state as well as the allocated state, the file server can provide transaction processing capabilities that previously have been performed by the operating system of a host processor. These transaction processing capabilities, for example, can abort transactions, and also recover the file system to a consistent and reasonable state after a system crash. The transaction processing capabilities can be performed more efficiently by the file server because some preparation for a commit operation, such as the logging of "before images" of modified file system blocks, can be done as a background process and coordinated with unlinking of memory blocks from the cache memory to a write queue for writing "before images" to the transaction log, or the unlinking of storage blocks from the storage system to a transaction log sharing the logical storage volume of the file system.

Figures 2, 3, 4:
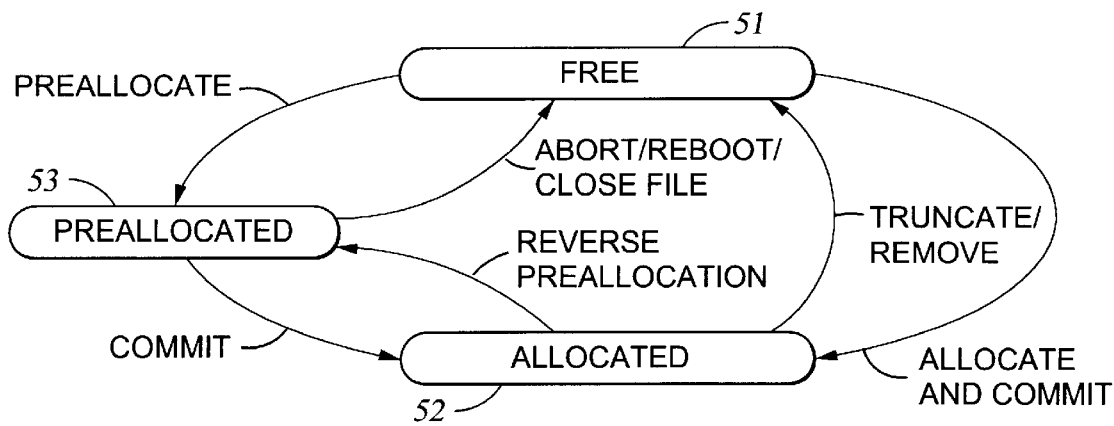
FIG. 2 is a state diagram for respective storage blocks in a file system stored in the file server of FIG. 1.
FIG. 3 is a block index in the form of a table for the blocks in the file system.
FIG. 4 is a table showing how an active bit and an allocated bit encode the states in the state diagram of FIG. 2.

FIG. 2 shows a state diagram for blocks in the file system. A logical block of the file system is either in a free state 51, an allocated state 52, or a preallocated state 53. For example, a file system block could go from the free state 51 to the allocated state 52 if the file server would directly commit to disk an increased extent for a file. For the file server 51, a typical path from the free state to the allocated state is to go from the free state to the preallocated state in the interim of a transaction, and later move from the preallocated state to the allocated state in response to a commit operation. A preallocated block may become a free block in response to an abort command or a reboot command. A typical abort command would be to close a file without saving revisions since the last save of the file. A block in the allocated state may move to the free state during a transaction in response to a truncation or remove command. For example, a file could be truncated in length when it is fairly certain that the truncated space will no longer be needed in the file. Removal of allocated blocks occurs when a file system object such as a directory, file or length is deleted. The file server of FIG. 1 permits truncation or removal of allocated blocks prior to a commit operation, so that they can be used in the file system cache prior to the next commit operation. The file server of FIG. 1 also permits a reverse preallocation operation in which an allocated block is demoted to the preallocated state. A typical example of reverse preallocation is when the extent of a file is shortened in order to remove the contents of a file with the expectation that the file may need to be increased in length prior to the next commit operation.

FIG. 3 shows one form of the block index, in which information has been placed in the block index to illustrate various states of the blocks. The block index is arranged in the form of a table where the first column includes an allocated on-disk flag for each file system block, the second column is an active flag for each block, the third column is an allocated flag for each blocks, the fourth column is a pointer to a cache block if the content of or for a file system block is in cache or otherwise the fourth column is 0 if the content of or for a file system block is not in cache, and a fifth column having a flag indicating whether or not the content of the cache block should be written down to disk during the next commit operation.

In the table of FIG. 3, the file system block 0 is a free block in the on-disk file system and also in the in-memory file system. File system block 1 is a block that has just been moved from the free state to the preallocated state. Also, a cache block has been allocated for content for the file system block 1 and data or metadata has been written to the allocated cache block. File system block 2 is in the allocated state. For example, file system block 2 has passed from the free state to the preallocated state and then in response to a commit operation has become allocated and its contents in the cache have been written down to disk. File system block 3 is also in the allocated state, but its contents in cache have been changed so that its new contents will be written down to disk during the next commit operation. File system block 4 is in the allocated state, but it has been removed from the file system cache, because it has not been recently accessed. File system block 5 has become a free block in the in-memory file system although it is still allocated in the on-disk file system.

FIG. 4 shows how the active bit and the allocated bit encode the free state, the preallocated state, and the allocated state for the in-memory file system. If both the active bit and the allocated bit are 0, then the block is in the free state. If the active bit is set and the allocated bit is clear, then the block is in the preallocated state. If the active bit is set and the allocated bit is set, then the block is in the allocated state. Although various bits can be encoded in various ways to indicate the three states of free, preallocated, or allocated, the encoding shown in FIG. 4 leads to a very simple operation for changing the bits in response to a commit command. Whenever a commit command occurs, the state is changed simply by copying the active flag to the allocated flag.

Figure 5:
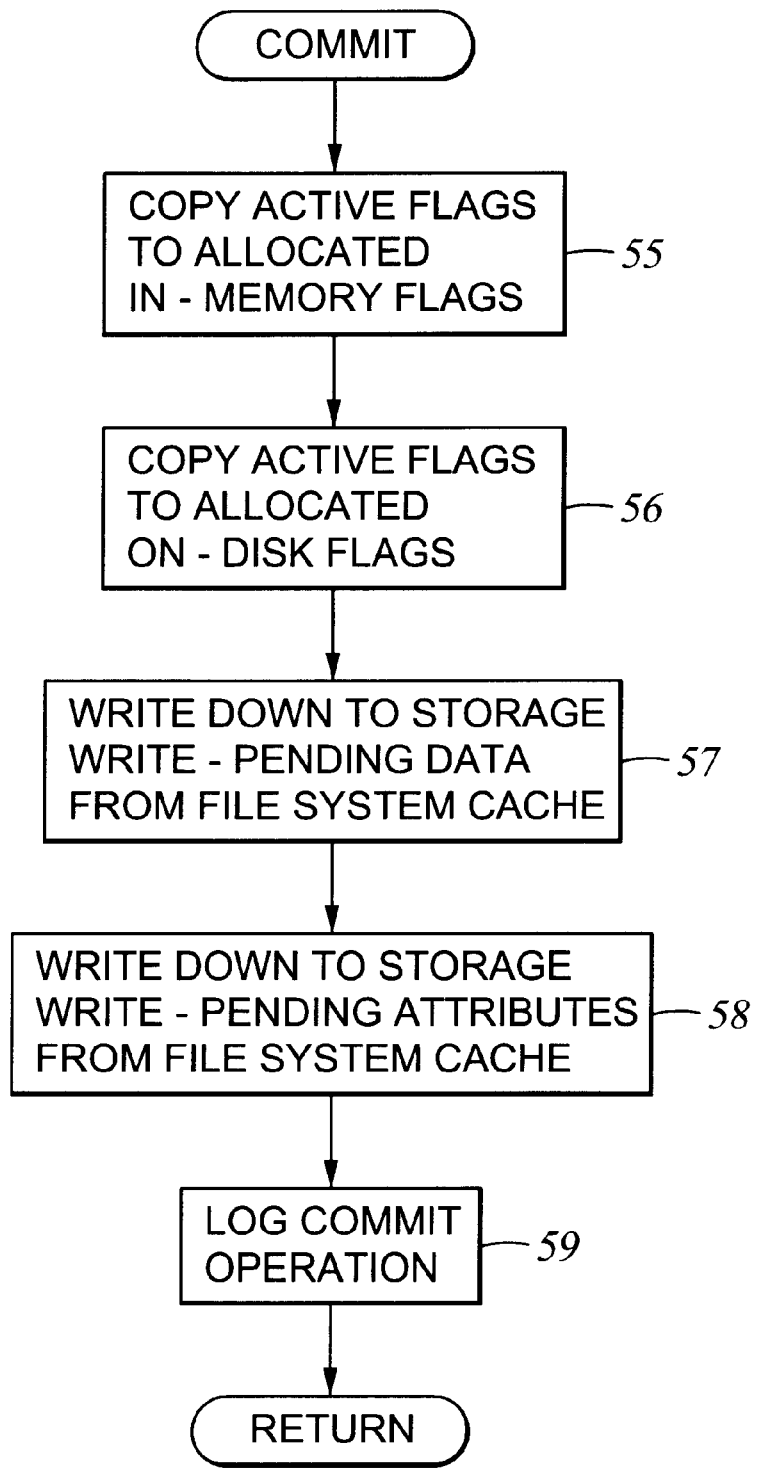
FIG. 5 is a flow chart of a routine for performing a commit operation.

FIG. 5 shows how the file server can be programmed to perform a commit operation. In a first step 55, the file server copies the active flags to the allocated in-memory flags. In step 56 the file server copies the active flags to the allocated on-disk flags. In step 57 the file server writes down to storage the write-pending data from the file system cache. In step 58 the file server writes down to storage write-pending attributes from the file server cache. Then in step 59 the file server logs the commit operation, and the routine is finished.

The commit operation of FIG. 5 could be performed for the entire file system or any specified group of objects in the file system. For example, the in-memory directory and file mapping data structure identifies the present hierarchical relationship between the objects in the file system, the blocks presently allocated to each of the file system objects, and the blocks that contain object attributes and the blocks that contain object data. In the typical case where blocks would be deallocated from one object and reallocated to another object, a user would obtain a read/write lock on a directory including the two objects to in effect obtain a read/write lock on all objects in the directory, and the commit operation would be performed for all blocks within the directory.

Figure 6:
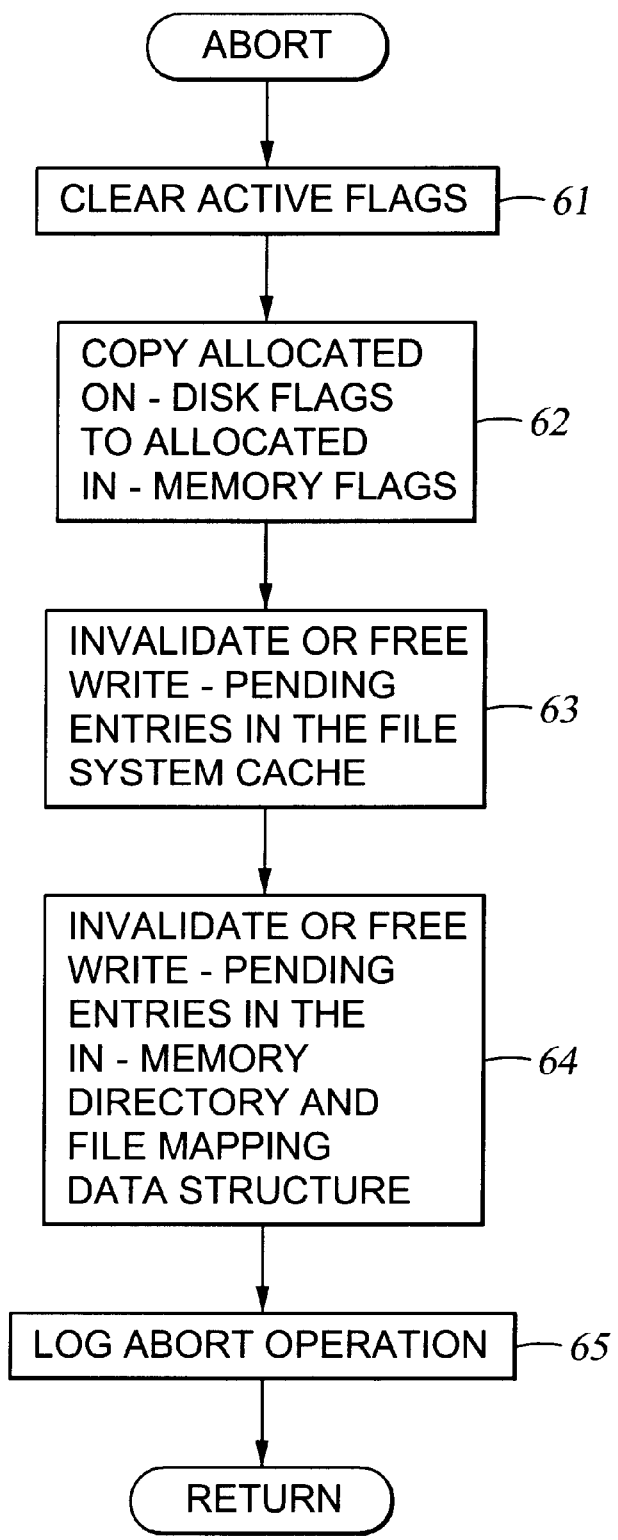
FIG. 6 is a flow chart of a routine for performing an abort operation.

FIG. 6 shows how the file server can be programmed to perform an abort operation. In step 61, the file server clears the active flags. In step 62, the file server copies the allocated on-disk flags to the allocated in-memory flags. In step 63, the file server invalidates or frees write-pending entries in the file system cache. In step 64, the file server invalidates or frees write-pending entries in the in-memory directory and file-mapping data structure. In step 65, the file server logs and abort operation in the transaction log, and the abort routine is finished.

The present invention permits the allocations of the file system blocks to the file system objects and also the hierarchical relationships between the file system objects to freely change during a transaction. Therefore, when an abort operation is performed, the file server invalidates or frees not only file system cache blocks for modified file system blocks but also portions of the in-memory directory and file mapping data structure that have been modified to be different from the on-disk directory and file mapping data structure. When a file system access operation later tries to access the in-memory directory and file mapping data structure and finds that an entry is invalid or missing, that entry is read from the on-disk directory and file mapping data structure. Moreover, the abort operation in FIG. 65 can be performed for the entire file system or any specified group of objects in the file system.

Figure 7:
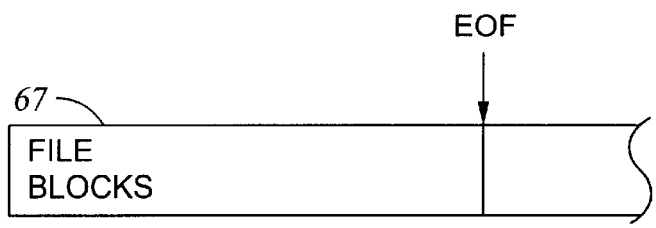
FIG. 7 is a diagram showing a file in the file system of FIG. 1.
Figure 8:
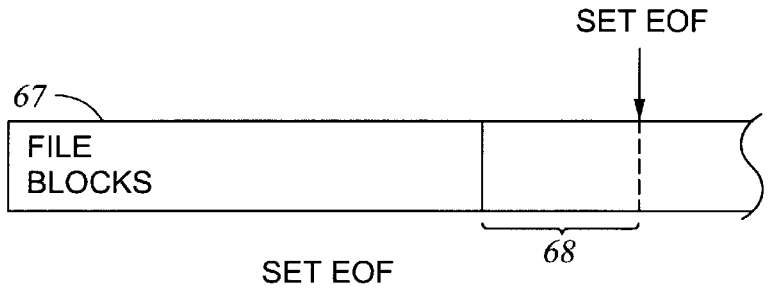
FIG. 8 shows the file of FIG. 7 after the block allocation for the file has been changed in response to a request to lengthen the file.

FIGS. 7 and 8 illustrate the case of an extension of a file 67. "EOF" is an abbreviation for "end of file." "SET EOF" indicates where the end of file becomes after the file has been extend. The file 67 is an array of blocks, having an extent specified by a "file extent" attribute of the file. The file extent attribute, for example, specifies the number of blocks allocated to the file.

FIG. 8 shows that the length of the file 67 is extended by adding a number of blocks 68. In the usual case, the blocks 68 are free blocks that are put in a preallocated state when they are linked into the in-memory file data structure. Alternatively, the blocks 68 could be initially preallocated or allocated blocks unlinked from another data structure.

Figure 9:
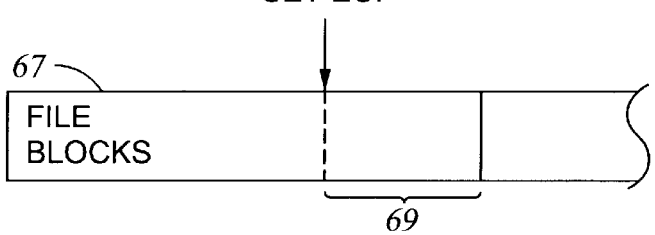
FIG. 9 shows the file of FIG. 7 after the block allocation for the file has been changed in response to a request to shorten the file.

FIG. 9 shows an alternative situation where the file 67 is shortened. In this case the blocks 69 are truncated or removed from the file. There is no need to wait for a commit operation to change the blocks from the allocated state to the free state. Moreover, the blocks 69 could be demoted from the allocated state to a preallocated state and linked to another file data structure.

The file server in FIG. 1 also permits a situation where the file extent is not changed but blocks in a file, such as blocks 69 at the end of a file, may be changed from the allocated to the preallocated state or to the free state. For example, the file could be a data transmission buffer or queue from which data is read. The blocks containing the old data are unlinked from the queue, and replaced by linking blocks of new data into the queue. The unlinked blocks are returned to the preallocated state if the file will be receiving new data in these blocks prior to the next commit operation. Otherwise, the unlinked blocks are returned to the free state.

Figure 10:
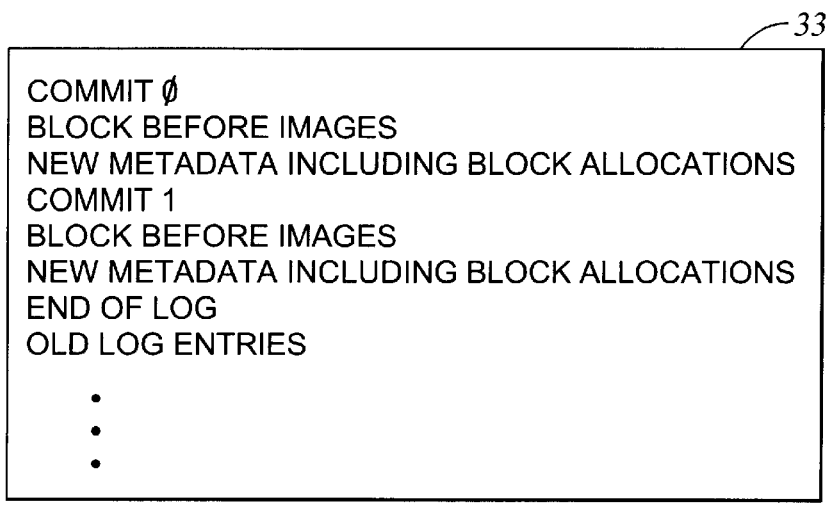
FIG. 10 shows an example of content in a transaction log.

FIG. 10 shows an example of contents of the transaction log 33. In this example, it is assumed that a single file has been opened by a single client, and therefore all of the information shown in the log relates to one client and one file. It is assumed that the transaction log is started for an initial consistent state of the file system on disk. This initial consistent state is indicated by a first commit entry tagged with a sequence number of "0". The log then includes entries for block before images. These entries include the content of file blocks prior to not yet committed write operations being performed on the blocks in the file system cache. Then the log includes new metadata including block allocations. The new metadata is included in the log in order to clean-up the on-disk file system during restoration to its last committed state, and to possibly recover data written to the on-disk file system since its last committed state. Following the block before images are new metadata including block allocations. If a crash would happen to occur during the writing of new metadata to the on disk file system, then the new metadata from the log could be used to recover the new data or to cleanup the file system when rolling back the state of the file to the last committed state. Following the new metadata is an entry indicating that a first commitment operation has been successful. After the first commit entry, there is again block before images and new metadata including block allocations for a second transaction. Following the new metadata is the end of the log, indicating that commitment has not been finished for the second transaction. Following the end of the log are old log entries. The old log entries follow the new log entries because the log file can be continuously reused. Once the end of the file extent is reached during writing to the log, the writing will continue looping back to the beginning of the log. This does not cause problems so long as the log is large enough to include all of the entries for any one transaction. The overflow condition can be detected by keeping a list of the file system objects that are open and for each open object keeping a pointer into the log position for the opening of the file or the last commit. If the write pointer to the transaction log advances to the pointer in the list for any open file system object, then an overflow of the log has occurred. If the write pointer to the transaction log gets close to the pointer in the list for any open file system object, a warning message can be returned to the user or users having opened the file system object.

Figure 11:
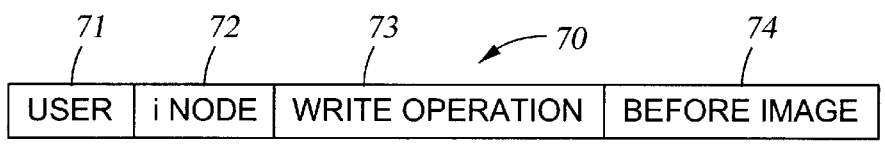
FIG. 11 is a diagram showing content of an entry in the transaction log for the case of a write operation that first modifies content of a block in the on-disk file system.

FIG. 11 shows a typical format for a transaction log entry including block before images. The entry generally designated 70 includes a user or process identifier 71, an inode identifier 72, identifying a file system object, a specification 73 of the write operation that first modified the blocks in the file system object since the last commit of the file system object and in particular a specification of the blocks being written to, and then the before image 74 of the block contents being modified by the write operation.

Figure 12:
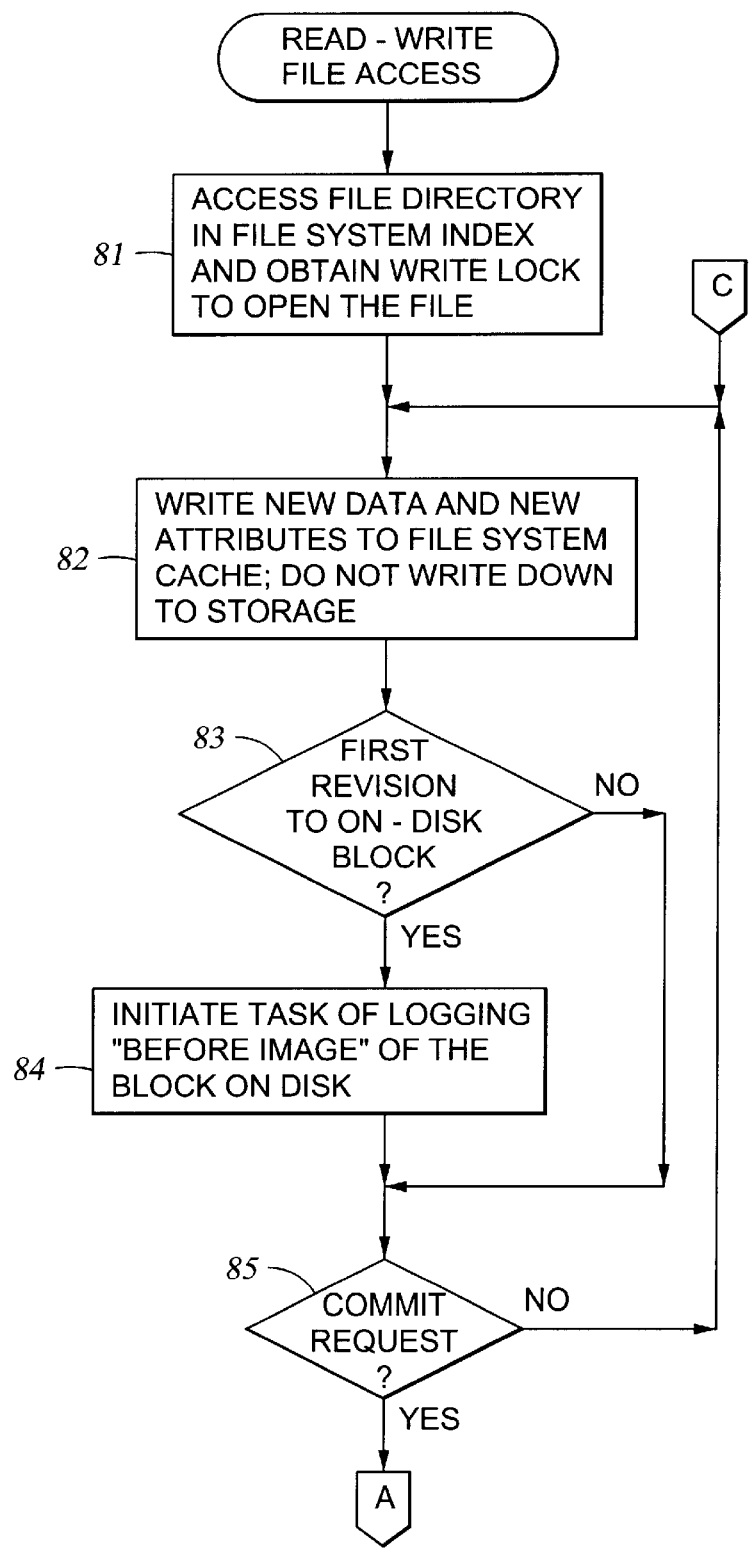
FIG. 12 is a first sheet of a flow chart showing how the file server can be programmed to perform read-write file access.

FIG. 12 is a flow chart showing how the file server of FIG. 1 can be programmed to perform read-write file access. In a first step 81, the file server accesses the file directory in the file system index and obtains a write lock to open the file. Then in step 82, the file server writes new data and new attributes to the file system cache, but does not at that time write down the new data and new attributes to storage. In step 83, execution branches if the write operation is not the first revision to an allocated on-disk block. It is the first revision to an allocated on-disk block when the block is allocated in the on disk file system and the write pending flag for the cache is not set and will be set when the write to the cache is completed.

Once the write to the cache is completed, then in step 84 the file server initiates a task of logging the "before image" of the block as found on disk. This before image need not be actually read from disk at that time if it already exists in the cache block prior to the write operation. Moreover, if the file system block is a so-called indirect block or a data block, the block need not have any predefined location on disk and therefore may be dynamically allocated to various file system objects. In this case, the before image can be logged to the log file by writing to the log file a pointer to the before image on disk, and in the metadata for the in-memory file system, allocating a new block to receive the new data for the indirect block. In other words, instead of copying data from one block to another, a new block is allocated for the new data, and the new data is linked into the in-memory file system object by switching a pointer from the old data to the new data.

Figure 13:
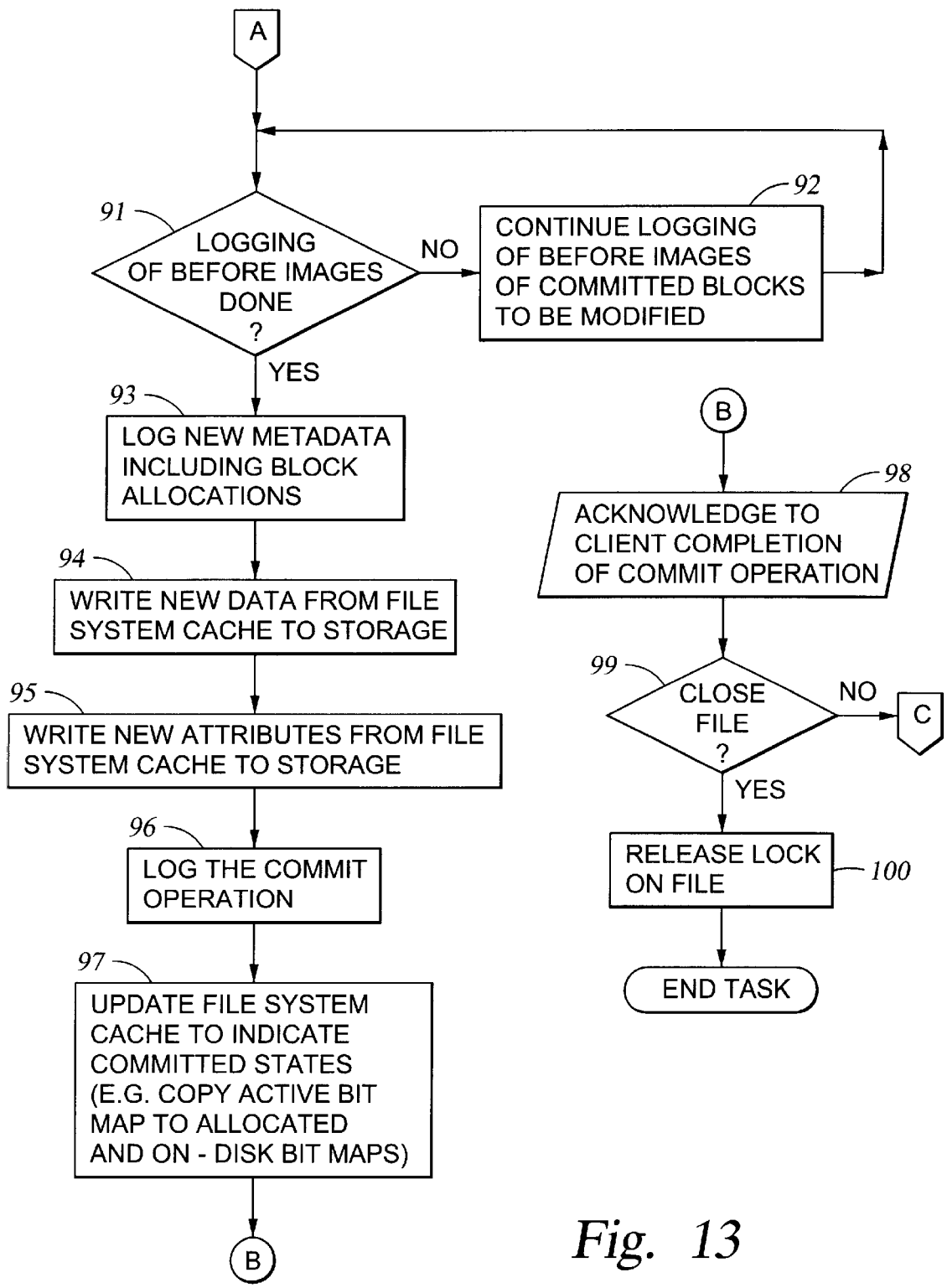
FIG. 13 is a second sheet of the flow chart begun in FIG. 12.

Execution continues from step 84 to step 85. Execution also reaches step 85 from step 83 when the new data is not a first revision to an allocated on-disk block. In step 85, execution loops back to step 82 until a commit request occurs. When the file server receives a commit request, then execution continues to step 91 on FIG. 13. In step 91, the file server checks whether the logging of the before images is done. If not, then execution branches to step 92 to continue the logging of the before images of the committed blocks to be modified. Eventually the logging of the before images is completed, and execution continues from step 91 to step 93. In step 93, the file server logs the new metadata including block allocations to the transaction log. Then in step 94, the file server writes all of the new data from the file system cache down to the disk storage. The new data in the file system cache are the file system data blocks having a write pending flag set. Then in step 95, the file server writes new attributes from the file system cache down to the disk storage. These new attributes are in file system attribute blocks having write pending flags that are set. Then in step 96, the file server logs the commit operation into the transaction log. Next in step 97, the file server updates the file system cache to indicate the committed states. For example, the active bit map is copied to the allocated bit map and to the on-disk bit map. Then in step 98, the file server acknowledges to the client completion of the commit operation. In step 99, execution branches back to step 82 of FIG. 12 if the file is not to be closed. If the commitment operation is in response to a save and close file request, then execution continues from step 99 to step 100. In step 100, the file server releases the client's lock on the file, and the read-write file access task is finished.

Figure 14:
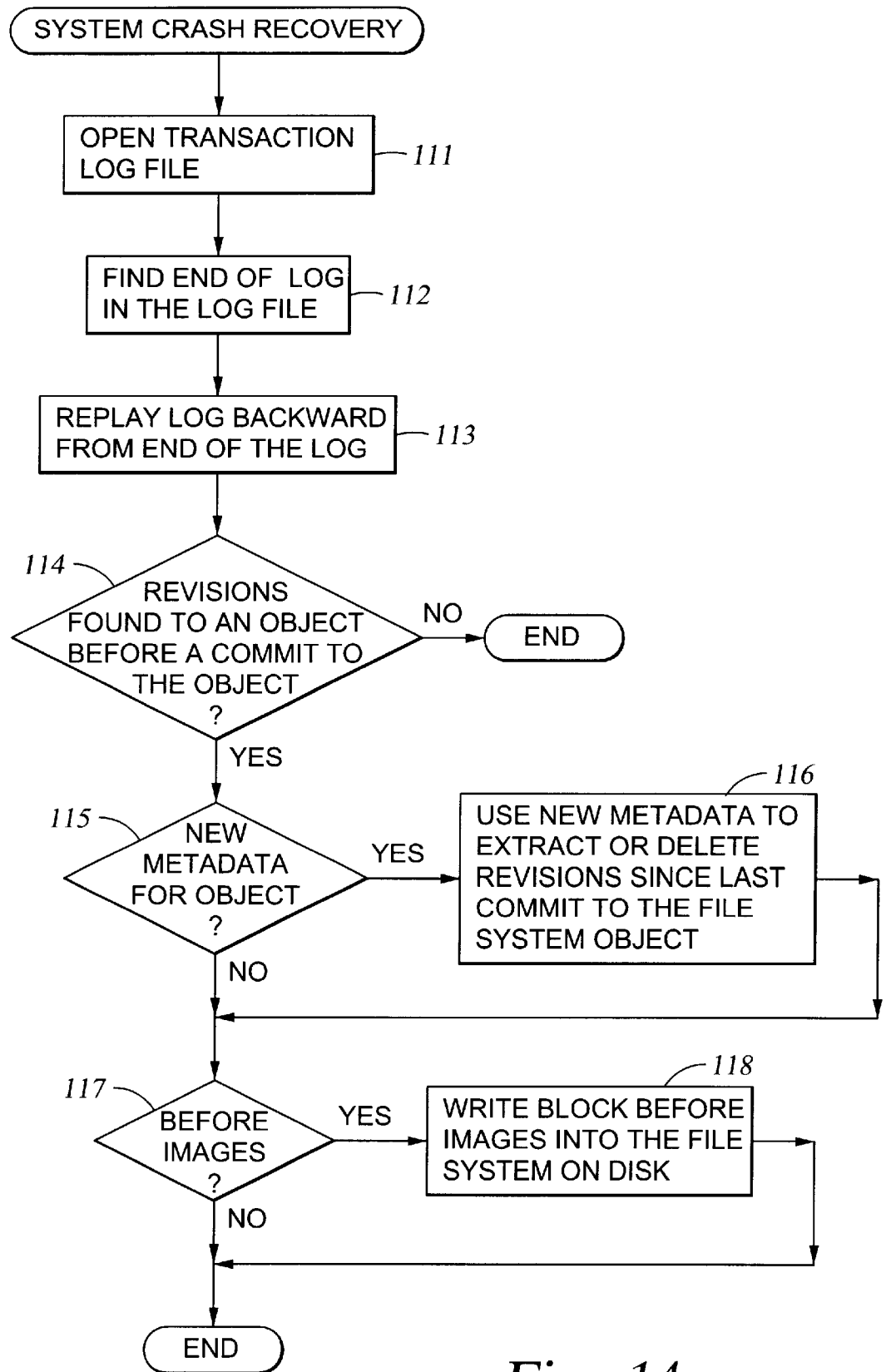
FIG. 14 is a flow chart showing how the file server of FIG. 1 can be programmed to recover from a system crash.

Turning now to FIG. 14, there is shown a flow chart of programming for the file server to perform system crash recovery. In a first step 111, the file server opens the transaction log file. Then in step 112, the file server finds the end of the log in the log file. As described above with respect FIG. 10, the end of the log could appear in the middle of the log file. Then in step 113, the file server replays the log backward starting from the end of the log. While replaying the log backward, the file server looks for revisions to an object before a commit entry is reached for the object. Since the log is being replayed backwards, these revisions occur in time after the corresponding commit operation was performed. If no revisions are found to a object before reaching a commit entry for the object, then the crash recovery is completed for that object. Otherwise, for each object having revisions before reaching a commit entry for the object, execution continues from step 114 to step 115.

In step 115, if the revision is new metadata for the object, then the new metadata is used in step 116 to extract or delete revisions since the last-end-time commit operation to the file system object. For example, if the new metadata is for an object being created, then the metadata can be used to find data for that object and to remove any of the data for that object from the on-disk file system. The deletion is not necessary for returning the object to its last consistent state, but it could be useful for removing sensitive information from the logical storage volume of the on-disk file system.

Once all of the new metadata is used to extract or delete revisions since the last-in-time commit operation to the file system object, execution continues to step 117. Execution also continues to step 117 directly from step 115 if there is no metadata for the object. In step 117 the file server checks whether there are any before images for the object. If so, then in step 118, then the before images are written into the file system on disk in order to return the file system to the consistent state for that object existing at the last-in-time commitment operation for that object. After step 118 has been completed for all such before images, the crash recovery is completed. Also, execution is finished when step 117 finds that there are no such before images.

Figure 15:
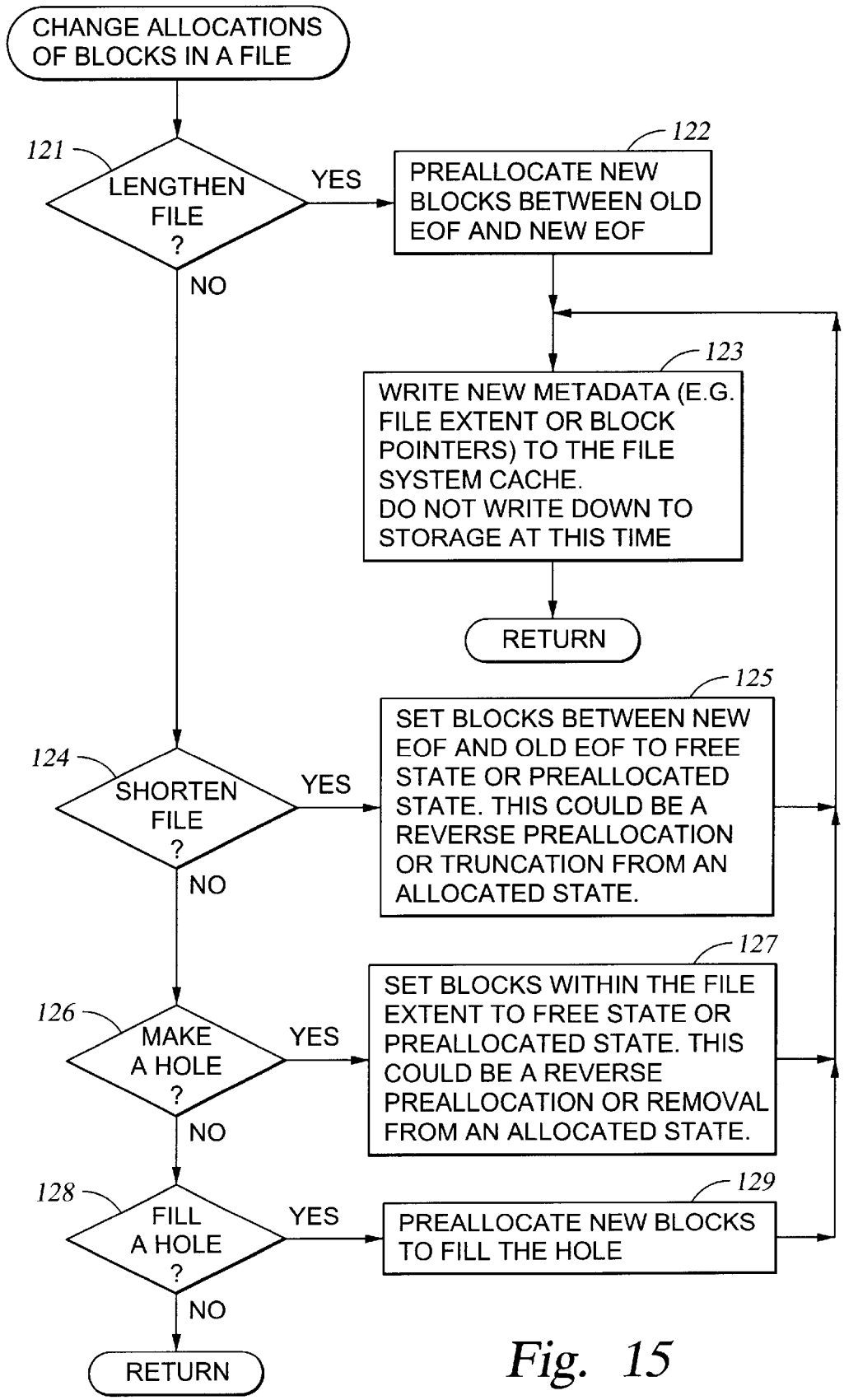
FIG. 15 is a flow chart showing how the file server can be programmed to respond to various requests that modify the allocation of blocks in a file.

FIG. 15 shows a flow chart for programming the file server to change allocations of blocks in a file. In a first step 121, execution branches to step 122 if the change is to lengthen the file. In step 122, new blocks are preallocated between the old end of file and the new end of file. Then in step 123, the new metadata, for example, the increased file extent, is written to the file system cache. The new metadata, however, is not written down to storage at this time and instead any writing of the new metadata will be written down to storage at commitment time. After step 123, the routine is finished.

If in step 121 the change in allocation of blocks in the file is not to lengthen the file, then execution continues to step 124. In step 124, execution branches to step 125 if the change in allocation is to shorten the file. In step 125, the blocks between the new end of file and the old end of file are set to a free state or to a preallocated state. This could be a reverse preallocation or a truncation from an allocation state. After the state has been changed appropriately in the block index of the file system index, execution continues from step 125 to step 123 to write the new metadata to the file system cache. For example, the new file extent is written to the file system cache. The new metadata is not written down to storage until a commitment operation. After step 123, the routine is finished.

Execution continues from step 124 to step 126 if the change in allocation of blocks in the file is not to shorten the file. Execution branches from step 126 to step 127 if the change in allocation is to make a hole in the file. In step 127, blocks within the file extent are set to the free state to the preallocated state. This could be a reverse preallocation or a removal of blocks from the allocated state. Execution continues from step 127 to step 123.

Execution continues to step 126 to step 128 if the change in allocation of blocks in the file is not to make a hole in the file. Execution branches from step 126 to step 127 if the change in allocation is to fill a hole in the file. In step 127, new blocks are preallocated to fill the hole. The new blocks could be free blocks or they could have been allocated or preallocated blocks unlinked from another file system object. Execution continues from step 129 to step 123.

If the change in allocation of blocks in the file was not to fill a hole, execution returns from step 128.

Figure 16:
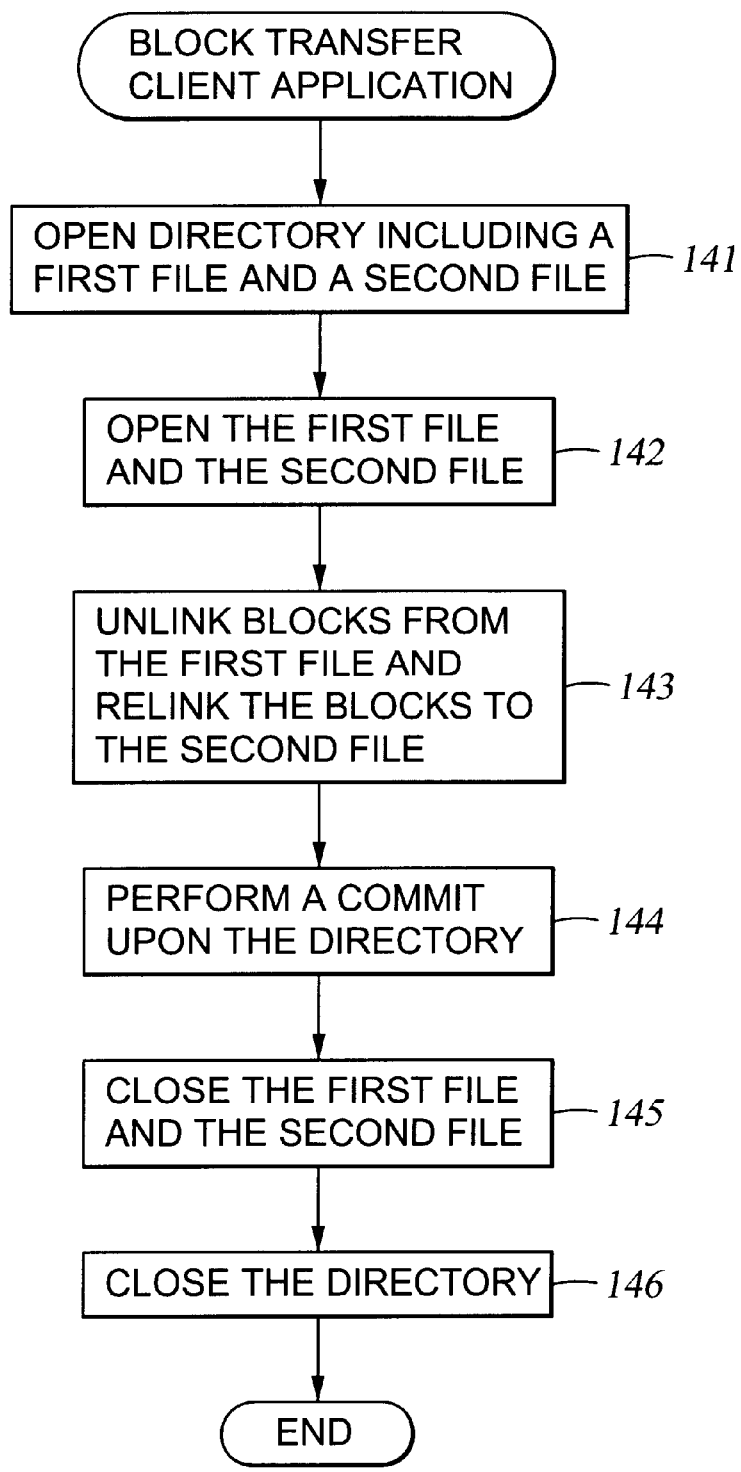
FIG. 16 is a flow chart showing how a client can be programmed to use the file server for efficient transfer of data between files.

FIG. 16 shows how the client can be programmed to use the file server for efficient transfer of data between files. In a first step 141, the client requests the file server to open a directory including a first file and a second file. In step 142, the client requests the file server to open the first file and the second file. In step 143, the client requests the file server to unlink blocks from the first file and to re-link the blocks to the second file. In step 144, the client requests the file server to perform a commit operation upon the directory. In step 145, the client request the file server to close the first file and the second file. In step 146, the client requests the file server to close the directory, and the application program is finished.

As described above, the file server in FIG. 1 has an in-memory directory and file mapping data structure 38. In a preferred implementation, this data structure is linked to a UNIX-based file system Vnode by a class pointer or by deriving a new class from Vnode. The in-memory file mapping data structure can be arranged in a child-sibling tree. Each internal tree node can represent an indirect block in the disk. The internal nodes of the same indirect level can be linked together by the "sibling" links. Each leaf node can save the file mappings. The preference for this data structure is based on the fact that in the normal cases, there are not many not-committed preallocation blocks in one file. Therefore, this data structure will use the minimum memory while the performance will not be reduced appreciably. An example of such a data structure is as follows:

```
Typedef
struct UFS MFMIntemalNode
{
daddr_t              fsbn; //fsbn is the on disk blk number for this indirect node
daddr_t              offset; //start is the logical offset of this indirect block points to
unsigned char        mode;   //mode
UFS_MFMIntemalNode   *next;  //child, sibling tree structure
void                 *child; //child may points to a UFS_MFMExtentNode stmcture
} UFS MFMIntemalNode;
typedef
struct UFS_MFMExtentNode
{
daddr_t              fsbn; //disk blk number for the first block in this extent
unsigned short       offset; //logical offset of the first block to the first block
//in its parent indirect block
unsigned short       length; //length of this extent
UFS MFMExtendNode    *next; //the next pointer
} UFS MFMExtentNode;
//class UFS_MemoryFileMap stores part/all physical file mappings in memory
class UFS_MemoryFileMap
{
public:
UFS MemoryFileMap(UFS_Vnode *node);
-UFS_MemoryFileMap();
//query logic->physical mappings, will get UFS BlockHoleAddr if the mapping
//doesn't exist
daddr_t getFileMap(daddr t blkNumber);
File_Status getFileMapList(daddr_t start,daddr_t nBlocks,daddr_t* dbList);
//set logic->physical mappings
File Status allocFileSpace(daddr t blkNumber, daddr t fsbn);
File_Status allocFileMapSpace(daddr_t start daddr_t nBlocks,daddr_t* dbList);
//remove mappings, fsbn or dbList can be used for checking purpose
File_Status releaseFileMap(daddrt blkNumber daddr_t fsbn=0);
File Status releaseFileMapList(daddrt start,daddrt nBlocks,daddr_t* dbList);
//commit mappings
File Status commitFileMap(daddrt blkNumber, daddr t fsbn =0);
File- Status commitFileMapList(daddrt start,daddrt nBlocks,daddr_t* dbList);
//remove all mapping at one shot
File_Status          resetAll();
private:
File_Status          getIndirect(Blockindex start,UFS MFMIntemalNode* inNode);
File_Status          makeIndirect(Blockindex start,UFS MFMInternalNode* inNode);
File_Status          makePhysicalIndirectBlock(UFS M FmIntemalNode* inNode);
File_Status          releaseOrCommit(daddr t start,d~ddr t nBlocks,bool commit,daddr_t
*dbList);
Sthread_Mutex        mutex;
UFS Vnode            *node;
dadd_t               directBlocks[NDADDR];
UFS _MFM InternalNode *indirectBlocks[NIADDR];
}
```

In the above data structure, each UFS MemoryFileMap object would have a local lock, and the operations on this file would be serialized. It would be possible that these operations would try to acquire a logging lock and an inode lock while holding this local lock. The other functions and the upper file system layer should not call UFS_MemoryFileMap functions while holding these two locks. If the in-memory file mapping would only be used for pre-allocation, it may be not necessary to intercept other Vnode operations. Each pre-allocation block should have a write lock registered in the lock database in the upper layer and the lock database should guard these vnode operations and release/revoke the lock as well as release/commit the pre-allocation. For reversing the block state from allocated to pre-allocation, the commit map could be released while marking the active map, and at the same time logging the release action to the log. This may be useful to reserve the allocation map even if the file is truncated.

For the above data structure, the following operations could be performed:

Allocation:

```
Reserve indirect & data blocks without    //by marking the CgBlkEntry's
logging
                                          //active block bitmap
Update in-memory file mapping data        //no on-disk change at all
structure
Commit:
GET_UPDATE_DESCRIPTOR(u,UPD_blockwrite); //get the
UFS_Descriptor
Traverse the in-memory file mapping data structure, commit necessary
indirect & data
blocks.
For each indirect & data block, do the allocation logging:
alloc lockWrite/newIndblkWrite/indblkWrite/inodeWrite
In the traversal, test whether UFS_UpdateDescriptor transaction
array overflow,
do u->complete if necessary;
Remove the committed block mappings from the in-memory mapping data
structure;
u->complete(FILE_OK);
update inode
Release/Abort:
```

-continued

```
Traverse the in-memory file mapping data structure, release
indirect/data blocks
accordingly by marking the CgBlkEntry's active block bitmap.
Remove the released block mappings from the data structure.
Exported interfaces
File Status getFileMap(ulong firstLogicalBlock, ulong size, extentEntry*
&extList,
ByteIndex &fileSize);
File Status allocSpace(ulong firstLogicalBlock, ulong size, extentEntry*
&extList,
ByteIndex &fileSize);
File_Status commitAllocation(extentEntry* extList, ByteIndex lastOffset);
File Status releaseAllocation(extentEntry* extList);
```

The memory allocated to the in-memory file system could be specified by a quota. The quota could be checked in the allocSpaceList, and the pre-allocation size could be kept in the in-memory data structure. Whenever the memory is allocated, the quota could be checked against preAllocSize+ newAllocRequest. The quota modification would happen at the commit time. Disk storage for the file system could be allocated as follows. For direct blocks, try to allocate near the previous one or in the inode cg group. For indirect blocks, if the first one, allocate blindly. If the parent & child indirect blocks are allocated at the same time, e.g. indirection level>=2, then try to allocate the child indirect block near the parent. Data blocks would be allocated similar to direct blocks. In other words, try to allocate near the previous data block.

In view of the above, there has been described a file server that has transaction processing capabilities previously supplied by the operating system of a host computer. On-disk file system metadata is changed only at commit time, and a transaction log protects the transition. The disk state can only be a consistent state, resulting from a commit operation. All disk-block reservation and pre-allocation mapping are in the memory, and after a crash, they are automatically discarded. The file server therefore relieves the client of processing burden and also reduces network traffic. In addition, the file server can more efficiently perform the transaction processing capabilities and reduce the frequency of access to storage by judicious allocation of file system blocks and transfer of file system blocks between file system objects, cache memory, and the transaction log. The differentiation between preallocation states and allocation states of in-memory file system blocks also permits application programs to more efficiently transfer data between files.

What is claimed is:

1. A method of operating a file server having a file system cache memory and storage, a file system being stored in the storage, said method comprising:

(a) the file server receiving at least one write request from at least one client, and in response, writing new file system attributes and new file system data to the file system cache memory, the new file system attributes including new links between file system objects and file system blocks, (b) the-file server receiving a commit request from the client, the new file system attributes and the new file system data not being written into the file system in storage until receipt of the commit request, and in response to the commit request, writing the new file system attributes and the new file system data to the file system in storage;

wherein the file server maintains in memory a directory and file mapping data structure for the file system, the directory and file mapping data structure permitting file system block allocations and linkages between file system objects and the file system blocks to change during read/write access to the file system by the client prior to receiving the commit request, the file system block allocations including allocated blocks having block allocations that are the same as block allocations in the file system as stored in the storage, and preallocated blocks having block allocations that are different from block allocations in the file system as stored in the storage, the preallocated blocks storing new file system data for changes to be made to the on-disk file system and not yet committed to the on-disk file system, and the directory and file mapping data structure identifying the allocated blocks and the preallocated blocks and distinguishing the preallocated blocks from the allocated blocks.

2. The method as claimed in claim 1, wherein the file server changes the preallocated blocks to allocated blocks in response to the commit request.

3. The method as claimed in claim 2, wherein the file server maintains a bit map of preallocated blocks and a bit map of allocated blocks, and in response to the commit request, writes the bit map of preallocated blocks to the bit map of allocated blocks.

4. The method as claimed in claim 1, wherein the file server changes the preallocated blocks to free blocks in response to an abort request from the client.

5. The method as claimed in claim 4, wherein the file server has write pending entries in the cache memory that are linked to write pending entries in the directory and file mapping data structure in memory, and the file server invalidates the write pending entries in the cache memory and in the directory and file mapping data structure in response to the abort request.

6. The method as claimed in claim 1, wherein the file server changes allocated blocks to free blocks during read/write access to the file system by the client prior to receiving the commit request.

7. The method as claimed in claim 1, wherein the file server changes allocated blocks to preallocated blocks during read/write access to the file system by the client prior to receiving the commit request.

8. The method as claimed in claim 7, wherein in response to an abort request, the file server finds the preallocated blocks that were changed from allocated blocks and restores them to allocated blocks.

9. The method as claimed in claim 1, wherein the file server unlinks at least one block from a first file in the file system and links said at least one block to a second file in the file system in response to read/write access to the file system by the client prior to receiving the commit request.

10. The method as claimed in claim 9, wherein said at least one block is an allocated block when it is in the first file and said at least one block is a preallocated block when it is in the second file.

11. The method as claimed in claim 1, wherein the file server inserts a block into a hole in a file that is later accessed during read/write access to the file system by the client prior to receiving the commit request.

12. The method as claimed in claim 1, wherein the file server maintains a transaction log in the storage, and after a system crash, performs a recovery operation by accessing the transaction log to return the file system in the storage to a consistent state.

13. The method as claimed in claim 12, wherein the transaction log includes block before images that are written to the file system in storage to return the file system in storage to a consistent state, and the transaction log also includes new metadata including block allocations that the file server uses to delete revisions from the file system in the storage during the recovery operation.

14. A file server comprising, in combination:
a file system cache memory;
storage;
means responsive to a write request from a client for writing new file system attributes and new file system data to the file system cache memory, the new file system attributes including linkages between file system objects and file system blocks;
means responsive to a commit request from the client for writing the new file system data and new file system attributes to a file system in the storage;
means for maintaining in memory a directory and file mapping data structure for the file system, the directory and file mapping data structure permitting file system block allocations and linkages between file system objects and file system blocks to change during read/write access to the file system by the client prior to receiving the commit request, the file system block allocations including allocated blocks having block allocations that are the same as block allocations in the file system as stored in the storage, and preallocated blocks having block allocations that are different from block allocations in the file system as stored in the storage, the preallocated blocks storing new file system data for changes to be made to the on-disk file system and not yet committed to the on-disk file system, and the directory and file mapping data structure identifying the allocated blocks and the preallocated blocks and distinguishing the preallocated blocks from the allocated blocks.

15. The file server as claimed in claim 14, including means responsive to a commit request for changing the preallocated blocks to allocated blocks, and means responsive to an abort request for changing the preallocated blocks to free blocks.

16. The file server as claimed in claim 15, wherein the file server includes means for maintaining a bit map of preallocated blocks and a bit map of allocated blocks, including means responsive to a commit request for writing the bit map of preallocated blocks to the bit map of allocated blocks.

17. The file server as claimed in claim 14, wherein the file server has write pending entries in the cache memory that are linked to write pending entries in the directory and file mapping data structure in memory, and the file server includes means responsive to an abort request for invalidating the write pending entries in the cache memory and in the directory and file mapping data structure.

18. The file server as claimed in claim 14, further including means for changing allocated blocks to free blocks during read/write access to the file system by the client prior to receiving the commit request.

19. The file server as claimed in claim 14, further including means for changing allocated blocks to preallocated blocks during read/write access to the file system by the client prior to receiving the commit request.

20. The file server as claimed in claim 19, further including means for responding to an abort request by finding the preallocated blocks that were changed from allocated blocks and restoring them to allocated blocks.

21. The file server as claimed in claim 14, further including means responsive to read/write access to the file system by the client for unlinking at least one allocated block from a first file in the file system and linking said at least one allocated block to a second file in the file system prior to receiving the commit request.

22. The file server as claimed in claim 14, including means for maintaining a transaction log in the storage, and means for recovering from a system crash by accessing the transaction log to return the file system in storage to a consistent state.

23. The file server as claimed in claim 22, wherein the transaction log includes block before images that are written to the file system in storage to return the file system storage to a consistent state, and the transaction log also includes new metadata including block allocations, and the means for recovering from a system crash includes means for accessing the log to obtain the new metadata including block allocations and using the new metadata for deleting revisions from the file system in storage during the recovery operation.

24. A file server comprising, in combination:
a file system layer for mapping file names to data storage locations in response to a write request from a client;
a file system cache connected to the file system layer for storing new file system attributes and new file system data in response to the write request from the client; and
nonvolatile storage connected to the file system layer for storing the new file system attributes and the new file system data in response to a commit request from the client;
wherein the file system layer is programmed for responding to the write request from the client by writing the new file system attributes and the new file system data to the file system cache and not writing the new file system attributes and the new file system data to the file system in storage until receipt of the commit request from the client; and
wherein the file system layer is programmed for responding to the commit request from the client by writing the new file system data and the new file system attributes from the file system cache to the nonvolatile storage; and
wherein the file system layer is programmed to maintain in memory a directory and file mapping data structure for the file system, the directory and file mapping data structure permitting file system block allocations and linkages between file system objects and the file system blocks to change during read/write access to the file system by the client prior to receiving the commit request, the file system block allocations including allocated blocks having block allocations that are the same as block allocations in the file system as stored in the storage, and preallocated blocks having block allocations that are different from block allocations in the file system as stored in the storage, the preallocated blocks storing new file system data for changes to be made to the on-disk file system and not yet committed to the on-disk file system, and the directory and file mapping data structure identifying the allocated blocks and the preallocated blocks and distinguishing the preallocated blocks from the allocated blocks.

25. The file server as claimed in claim 24, wherein the file system layer is programmed to respond to a commit request for changing the preallocated blocks to allocated blocks, and for responding to an abort request for changing the preallocated blocks to free blocks.

26. The file server as claimed in claim 25, wherein the file system layer is programmed for maintaining a bit map of preallocated blocks and a bit map of allocated blocks, and for responding to a commit request by writing the bit map of preallocated blocks to the bit map of allocated blocks.

27. The file server as claimed in claim 24, wherein the file server has write pending entries in the cache memory that are linked to write pending entries in the directory and file mapping data structure in memory, and the file system layer is programmed to respond to an abort request for invalidating the write pending entries in the cache memory and in the directory and file mapping data structure.

28. The file server as claimed in claim 24, wherein the file system layer is programmed for changing allocated blocks to free blocks during read/write access to the file system by the client prior to receiving the commit request.

29. The file server as claimed in claim 24, wherein the file system layer is programmed for changing allocated blocks to preallocated blocks during read/write access to the file system by the client prior to receiving the commit request.

30. The file server as claimed in claim 29, wherein the file system layer is programmed for responding to an abort request by finding the preallocated blocks that were changed from allocated blocks and restoring them to allocated blocks.

31. The file server as claimed in claim 24, wherein the file system layer is programmed for responding to read/write access to the file system by the client for unlinking at least one allocated block from a first file in the file system and linking said at least one allocated block to a second file in the file system prior to receiving the commit request.

32. The file server as claimed in claim 24, wherein the file system layer is programmed for maintaining a transaction log in the storage, and the file server is programmed for recovering from a system crash by accessing the transaction log to return the file system in storage to a consistent state.

33. The file server as claimed in claim 32, wherein the transaction log includes block before images that are written to the file system in storage to return the file system storage to a consistent state, and the transaction log also includes new metadata including block allocations, and the file server is programmed for accessing the log to obtain the new metadata including block allocations and using the new metadata for deleting revisions from the file system in storage during the recovery operation.

* * * * *